(12) United States Patent
Burnside et al.

(10) Patent No.: US 10,544,834 B1
(45) Date of Patent: Jan. 28, 2020

(54) BEARING FOR USE IN HIGH SPEED APPLICATION

(71) Applicants: Rolls-Royce Corporation, Indianapolis, IN (US); Rolls-Royce North American Tedchnologies, Inc., Indianapolis, IN (US)

(72) Inventors: Phillip H. Burnside, Avon, IN (US); Andrew Schwendenmann, Avon, IN (US)

(73) Assignees: Rolls-Royce North American Technologies Inc., Indianapolis, IN (US); Rolls-Royce Corporation, Indianapolis, IN (US)

( * ) Notice: Subject to any disclaimer, the term of this patent is extended or adjusted under 35 U.S.C. 154(b) by 0 days.

(21) Appl. No.: 16/250,243

(22) Filed: Jan. 17, 2019

(51) Int. Cl.
*F16C 33/66* (2006.01)
*F16C 19/16* (2006.01)

(52) U.S. Cl.
CPC .......... *F16C 33/6659* (2013.01); *F16C 19/16* (2013.01); *F16C 33/6681* (2013.01); *F16C 2300/22* (2013.01); *F16C 2300/32* (2013.01); *F16C 2326/43* (2013.01)

(58) Field of Classification Search
CPC .............. F16C 33/6659; F16C 33/6681; F16C 2360/23
See application file for complete search history.

(56) References Cited

U.S. PATENT DOCUMENTS

| | | | |
|---|---|---|---|
| 3,042,462 A * | 7/1962 | Rosskopf | F16C 33/6659 184/6.26 |
| 3,066,990 A | 12/1962 | Frohlich | |
| 3,378,104 A | 4/1968 | Venable | |
| 5,489,190 A * | 2/1996 | Sullivan | F01D 25/18 184/6.11 |
| 6,132,094 A | 10/2000 | Cornelison et al. | |
| 6,398,833 B1 | 6/2002 | Santerre et al. | |
| 6,443,623 B2 * | 9/2002 | Sugita | F16C 33/6659 384/465 |
| 6,640,933 B2 | 11/2003 | Henry et al. | |
| 6,682,222 B2 | 1/2004 | Fisher | |
| 6,698,097 B1 | 3/2004 | Miura et al. | |
| 6,827,494 B2 | 12/2004 | Aguilar | |
| 7,384,197 B2 * | 6/2008 | Plona | F16C 33/58 184/11.2 |
| 7,470,064 B2 | 12/2008 | Link et al. | |
| 7,935,164 B2 | 5/2011 | Fang et al. | |
| 7,984,792 B2 | 7/2011 | Hoffmann et al. | |
| 7,993,425 B2 | 8/2011 | Corattiyil et al. | |
| 8,021,105 B2 | 9/2011 | Ammann et al. | |
| 8,443,843 B2 | 5/2013 | Mount et al. | |
| 8,517,612 B2 | 8/2013 | Metzger et al. | |
| 8,621,839 B2 | 1/2014 | Alecu et al. | |
| 9,033,581 B2 | 5/2015 | Carter et al. | |
| 9,121,303 B2 | 9/2015 | Dobek et al. | |
| 9,181,981 B2 * | 11/2015 | Dobek | F16C 33/6659 |

(Continued)

*Primary Examiner* — Thomas R Hannon
(74) *Attorney, Agent, or Firm* — Barnes & Thornburg LLP

(57) ABSTRACT

A bearing system includes bearing unit and a lubrication system. The bearing unit includes an outer race, a plurality of internal rotating components, and an inner race. The lubrication system includes an injector for delivering a stream of lubrication to the plurality of rotating components to withdraw heat generated and lubricate the bearing unit during operation of the bearing system.

20 Claims, 8 Drawing Sheets

(56) References Cited

U.S. PATENT DOCUMENTS

| | | |
|---|---|---|
| 9,409,464 B2 | 8/2016 | Tomkins et al. |
| 9,441,541 B2 | 9/2016 | Wotzak |
| 9,822,817 B2 | 11/2017 | Price et al. |
| 9,874,244 B2 | 1/2018 | Grillo et al. |
| 9,897,005 B2 | 2/2018 | Chilton et al. |
| 10,047,649 B2 * | 8/2018 | Lucas .................... F01D 25/18 |
| 2005/0047690 A1 | 3/2005 | Keramati et al. |
| 2008/0135332 A1 | 6/2008 | Ueda et al. |
| 2009/0294216 A1 | 12/2009 | Begin et al. |
| 2014/0116786 A1 | 5/2014 | Cooley et al. |
| 2014/0230422 A1 | 8/2014 | Placha |
| 2015/0135663 A1 | 5/2015 | Beier et al. |

\* cited by examiner

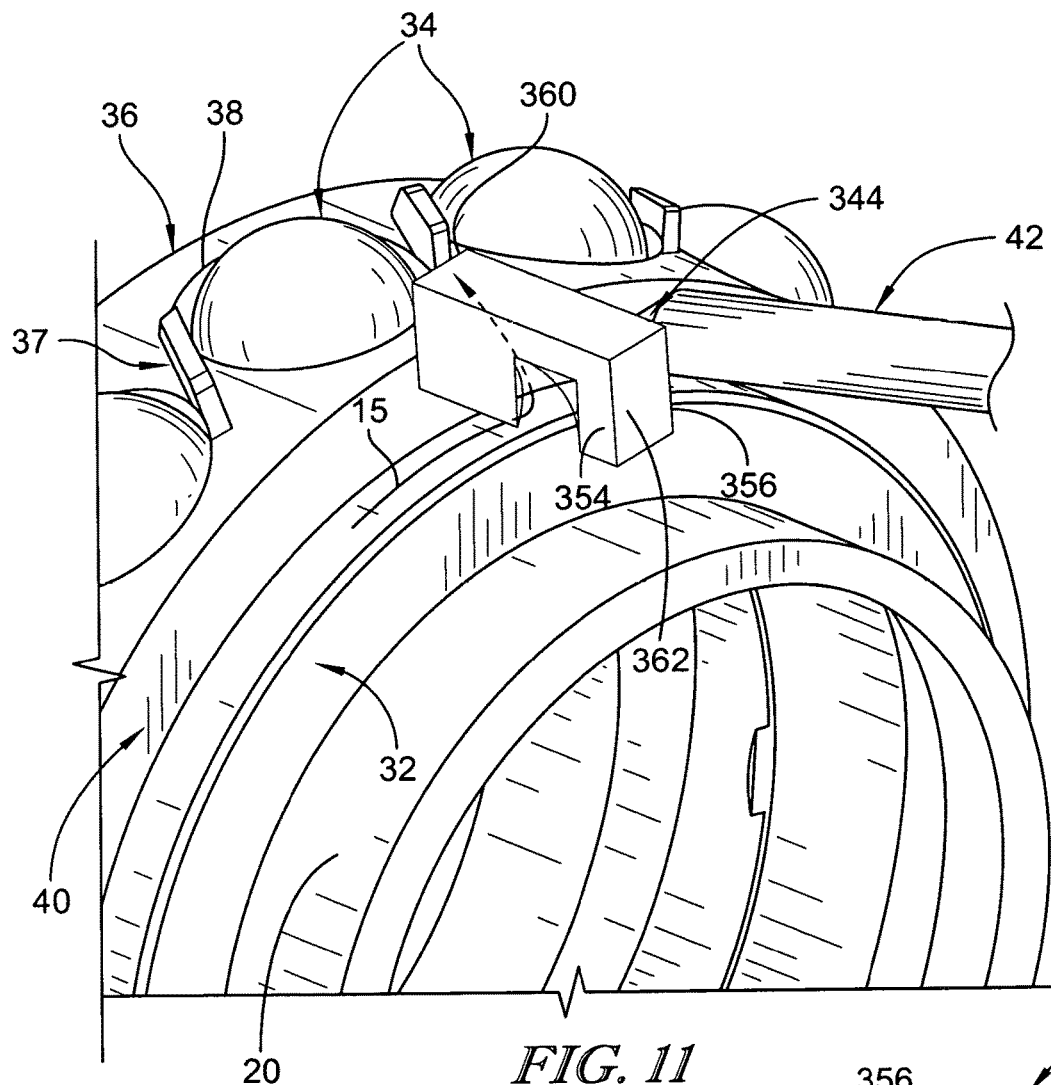
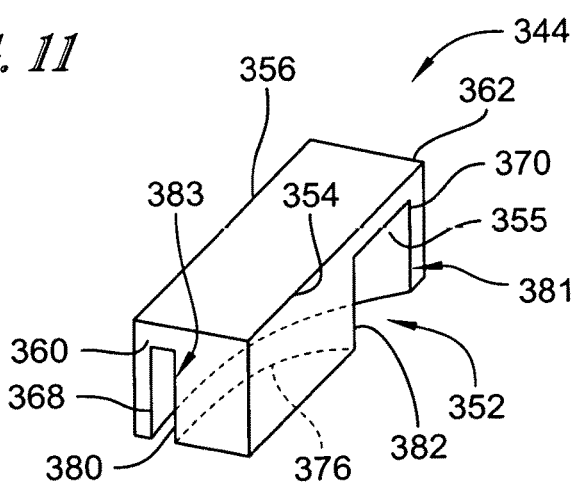
FIG. 11
FIG. 12

US 10,544,834 B1

BEARING FOR USE IN HIGH SPEED APPLICATION

FIELD OF THE DISCLOSURE

The present disclosure relates to bearing assemblies, particularly those including internal rotating components such as balls or rollers. More particularly, the present disclosure relates to bearing assemblies that are lubricated during operation.

BACKGROUND

Bearing assemblies are typically used to transfer loads between a rotating component and a fixed component or between two rotating components that move relative to one another. These bearing assemblies may be rotated at high speeds and may be subject to friction and/or elevated temperatures due to the high rotational speeds. Lubricants, such as oil, may be used to reduce friction in a bearing assembly and remove heat generated in the bearing assembly during operation.

Bearing assemblies used in high-speed applications may be difficult to lubricate due to the presence of forces caused by the high rotational speeds of the bearing assembly. One such force that may be generated by a high-speed bearing assembly is windage that flows circumferentially around the rotating component as the component rotates about an axis. Systems used to reduce or bypass the windage effects in high-speed applications may be complex and costly while less complex and less costly systems may not provide adequate lubrication capture efficiencies in the bearings when used in a high rotational speed environment. As such, there exists a need to provide a simple and cost-effective system for lubricating high-speed bearing assemblies while reducing the effects of windage.

SUMMARY

The present disclosure may comprise one or more of the following features and combinations thereof.

According to the present disclosure, a bearing assembly includes an outer race, an inner race, a plurality of internal rotating components, and a lubrication system. The outer race extends around a central axis. The inner race extends and rotates around the same central axis as the outer race. The plurality of rotating components are located in the radial gap between the inner race and outer race, and engage with both the inner race and outer race. The lubrication system is configured to provide lubrication to the plurality of internal rotating components. The lubrication system comprises a side-jet injector and windage barrier. The side-jet injector is located close to the outer race and configured to inject a stream of lubrication in an axial direction toward the plurality of rotating components. The windage barrier is located in a fixed position adjacent and upstream to the outlet of the side-jet injector. The windage barrier is configured to create a zone of stagnant fluid downstream of the windage barrier so that the stream of lubrication from the side-jet injector can move through the zone, from the outlet to the plurality of rotating components.

These and other features of the present disclosure will become more apparent from the following description of the illustrative embodiments.

BRIEF DESCRIPTION OF THE DRAWINGS

The detailed description particularly refers to the accompanying figures in which:

FIG. 11 is a perspective view of a third embodiment of a windage barrier, in accordance with the present disclosure, showing that the windage barrier is formed to include a channel defined by a pair of curved side wall portions that cooperate to redirect the windage toward the plurality of rotating components and accelerate the windage to provide an air-knife effect;

FIG. 12 is an enlarged top perspective view of the windage barrier of FIG. 11;

DETAILED DESCRIPTION

Figure 1:
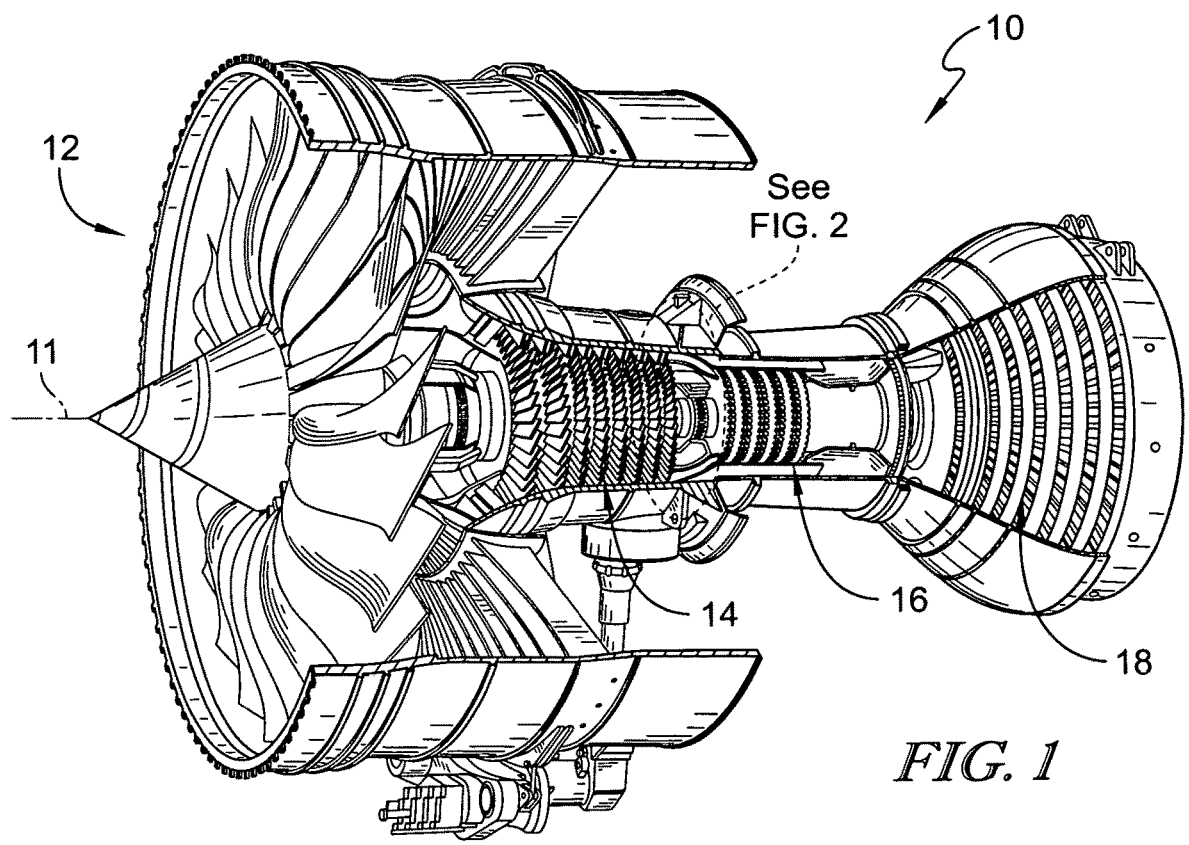
FIG. 1 is a perspective view of a gas turbine engine in accordance with the present disclosure, the gas turbine engine includes a bearing system and a high-speed rotor adapted to rotate about a central reference axis, the bearing system being configured to transfer axial loads between the rotor and a bearing housing included in the bearing system.

For the purposes of promoting an understanding of the principles of the disclosure, reference will now be made to a number of illustrative embodiments illustrated in the drawings and specific language will be used to describe the same.

An illustrative gas turbine engine 10 includes a fan 12, a compressor 14, a combustor 16, and a turbine 18 as shown in FIG. 1. The fan 12 is driven by the turbine 18 and provides thrust for propelling an air vehicle. The compressor 14 compresses and delivers air to the combustor 16. The combustor 16 mixes fuel with the compressed air received from the compressor 14 and ignites the fuel. The hot, high-pressure products of the combustion reaction in the combustor 16 are directed into the turbine 18 to cause the turbine 18 to rotate about a central reference axis 11 and drive the compressor 14 and the fan 12.

Each of the fan 12, compressor 14, the combustor 16, and the turbine 18 may be connected to each other via one or more rotors 20 that also rotate about the central reference axis 11 during operation of the gas turbine engine 10. The rotor 20 may experience loads in radial and/or axial directions as the rotor 20 is rotated about the central axis 11. Due to the presence of these loads, the gas turbine engine 10 further includes a bearing system 22 that extends circumferentially around the rotor 20 and engages the rotor 20 to transfer the loads experienced by the rotor 20 to the bearing system 22.

Figure 2:
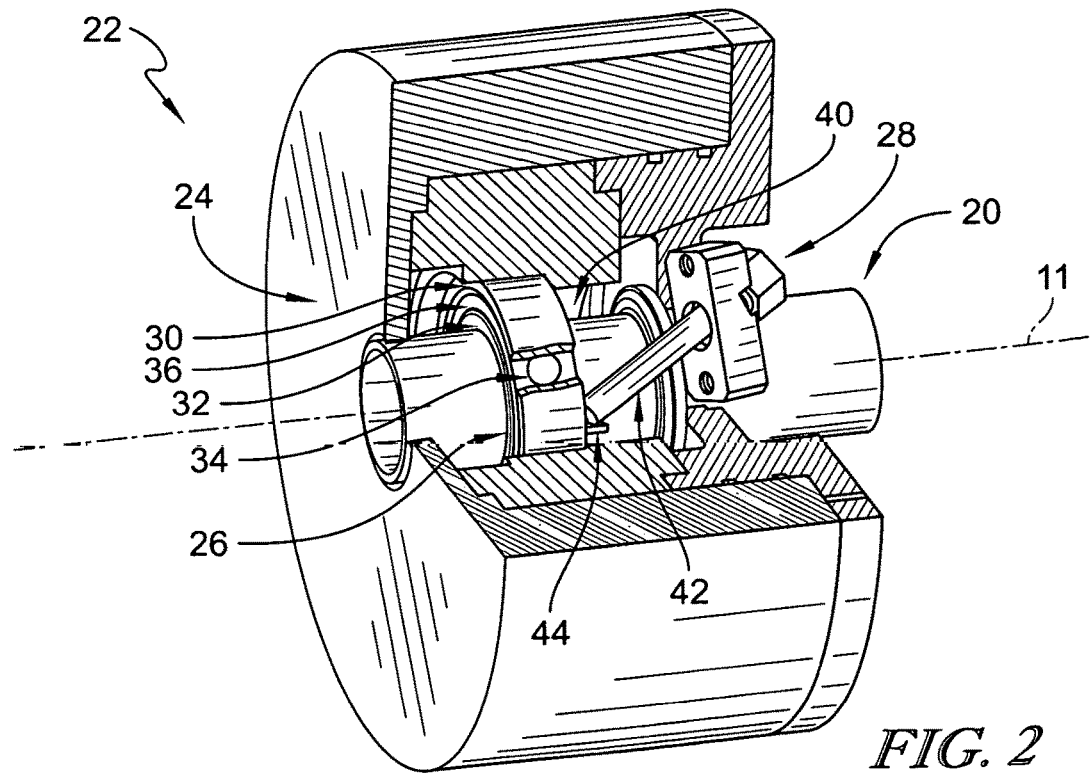
FIG. 2 is a perspective and partial cross sectional view of the bearing system showing that the bearing system includes a lubrication system configured to inject lubrication into the bearing system, the lubrication system located in a cavity between the rotor and the bearing housing and including a side-jet injector and a windage barrier positioned upstream of the side-jet injector to disrupt windage produced in the cavity by the high-speed rotor.

The bearing system 22 includes a bearing housing 24, a bearing unit 26, and a lubrication system 28 as shown in FIG. 2. The bearing housing 24 is fixed relative to the central axis 11 and extends circumferentially around the bearing unit 26 and the rotor 20. The bearing unit 26 is located radially between the rotor 20 and the bearing housing 24 to transfer the loads from the rotor 20 to the bearing housing 24. At least a portion of the bearing unit 26 is coupled to the rotor 20 for rotation therewith. Heat and friction may be generated within the bearing unit 26 as the rotor 20 rotates about the central reference axis 11. The lubrication system 28 is configured to inject lubrication from a lubrication source into the bearing unit 26 during operation of the gas turbine engine 10 to lubricate and cool the bearing unit 26. As such, the lubrication system 28 is provided to increase durability and extend the life of the bearing unit 26.

The bearing unit 26 is adapted for high speed applications and includes an outer race 30, an inner race 32, a plurality of rotating components 34, and a cage 36 for supporting the rotating components 34 as shown in FIG. 2. The outer race 30 is positioned radially outward of the inner race 32 and is coupled to the bearing housing 24. The inner race is mounted to the rotor 20 for rotation therewith about the central axis 11. The cage 36 is formed to include a plurality of bearing apertures 38 that receive individual rotating components 34 to maintain circumferential spacing between each of the rotating components 34. The cage 36 and plurality of internal rotating components 34 are both positioned radially between the outer race 30 and the inner race 32 to facilitate rotation of the inner race 32 relative to the outer race 30. The plurality of rotating components 34 are spherical (e.g., ball bearings); however, other rotating components, such as, for example, cylindrical roller bearings, may also be used.

Figure 3:
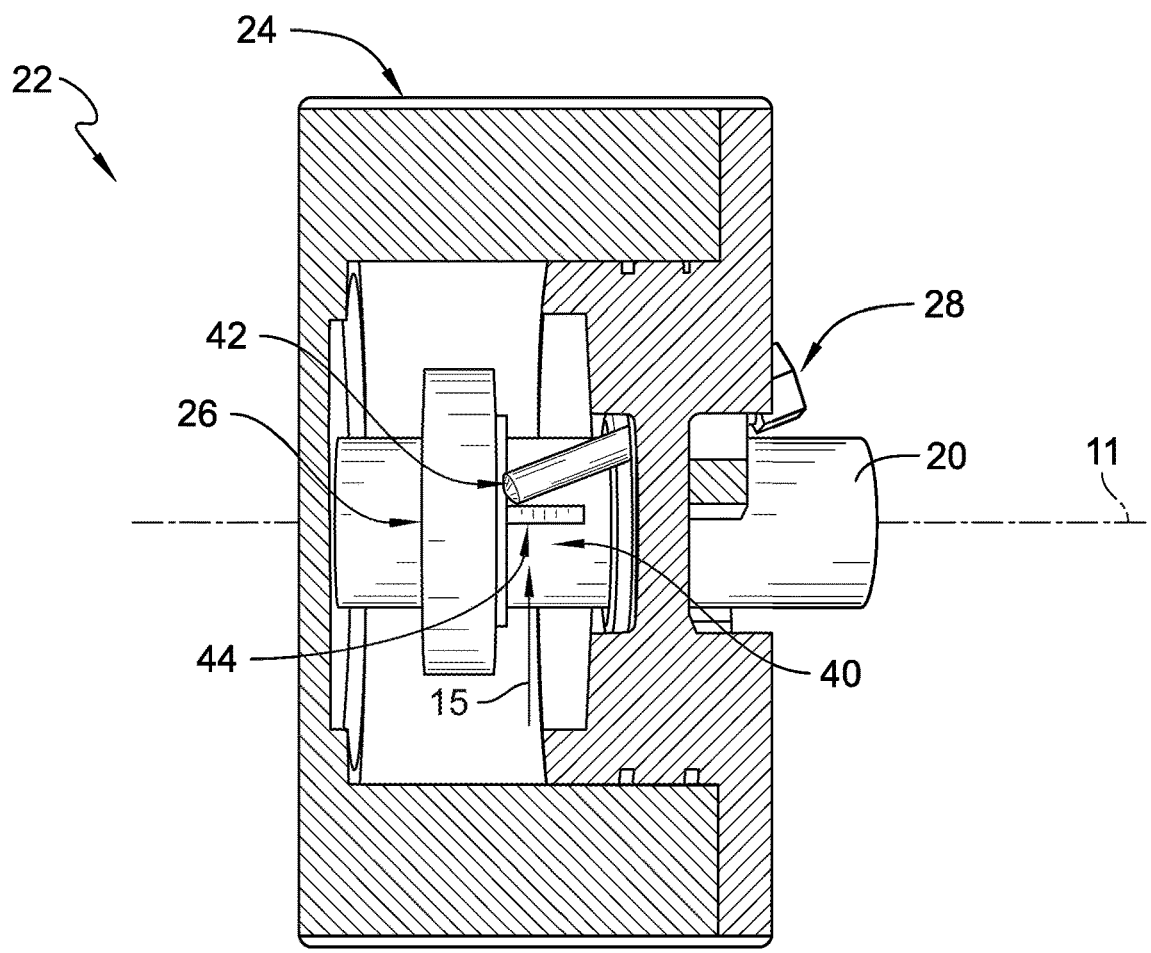
FIG. 3 is a top sectional view of the bearing system with a portion of the bearing housing removed to show the side-jet injector extending into the cavity and the windage barrier positioned upstream of the side-jet injector.
Figure 4:
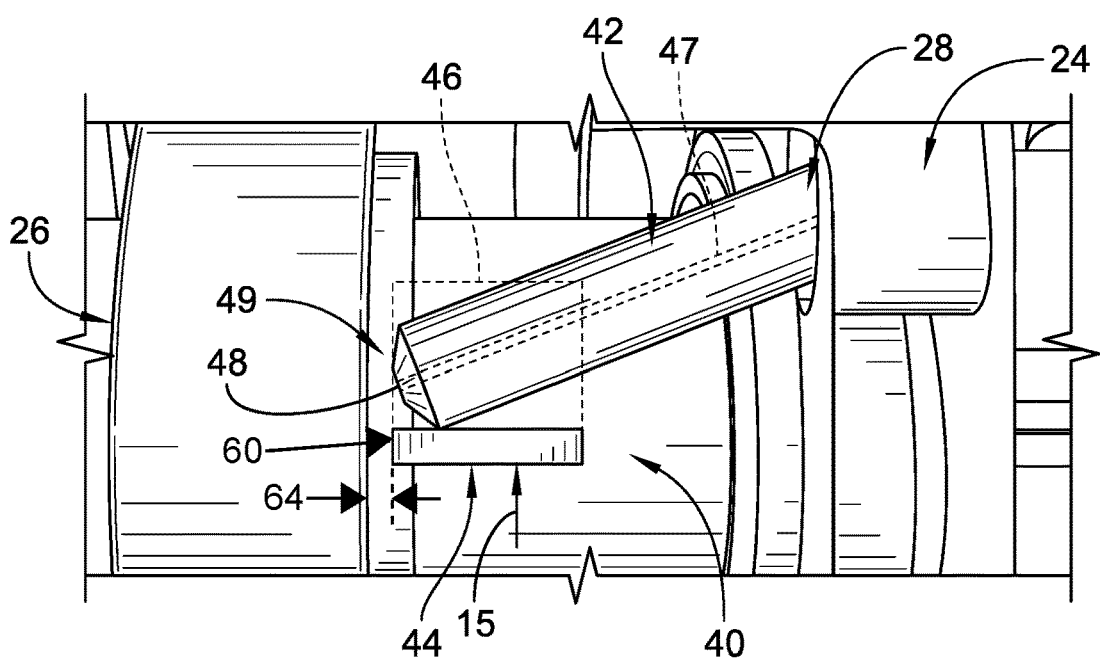
FIG. 4 is an enlarged view of the dashed region shown in FIG. 3 showing that the windage barrier disrupts windage in the cavity to provide a zone of stagnant fluid downstream of the windage barrier and the side-jet injector is positioned in the zone of stagnant fluid.

A cavity 40 is formed between the bearing housing 24 and the rotor 20 axially-aft of the bearing unit 26 as shown in FIGS. 3 and 4. The lubrication system 28 includes a side-jet injector 42 that extends into the cavity 40 to deliver lubrication from a lubrication source to the bearing unit 26. The side-jet injector 42 is illustratively embodied as a tubular member defining a passageway 47 that directs a stream of lubrication toward the bearing unit 26. The side-jet injector 42 extends through an end plate 25 included in the bearing housing 24 and into the cavity 40 from an aft end of the bearing system 22. The side-jet injector 42 is formed to include an outlet 48 that is positioned adjacent to the bearing unit 26 to deliver the stream of lubrication to the bearing unit 26 as suggested in FIGS. 3-4 and 6-7.

As the rotor 20 rotates about the central axis 11, windage 15 is formed in the cavity 40 and flows circumferentially around the axis 11 through the cavity 40. Often, the rotor 20 may reach speeds in excess of about 29,000 RPM. In such high-speed applications, bearing speed may be in a range of about 1.5 MDN and about 3 MDN such that a corresponding large amount of windage 15 is formed in the cavity 40. MDN is used to characterize bearing speed and is calculated, for example, by multiplying the bearing bore in millimeters by the shaft speed in rotations per minute and then dividing by one million. The outlet 48 of the side-jet injector 42 is spaced apart from the bearing unit 26 by an air gap 49. The side-jet injector 42 is configured to inject the stream of lubrication toward the bearing unit 26 to cross the air gap 49 and enter the bearing unit 26 through a space 50 formed between the inner race 32 and the outer race 30 as shown in FIGS. 6 and 7.

The lubrication system 28 further includes a windage barrier 44 positioned upstream of the injector 42 and configured to establish a zone of stagnant fluid 46 downstream of the windage barrier 44 such that the stream of lubrication source may cross the air gap 49 and reach the plurality of rotating components 34 as shown in FIG. 4. The side-jet injector 42 cooperates with the windage barrier 44 to deliver the stream of lubrication source to the rotating components 34 with an acceptable lubrication-source capture efficiency within the bearing unit 26. In other words, the windage barrier 44 reduces an amount or percentage of the stream of lubrication source induced by the windage 15 in the cavity 40 during high-speed operation of the rotor 20.

Figure 5:
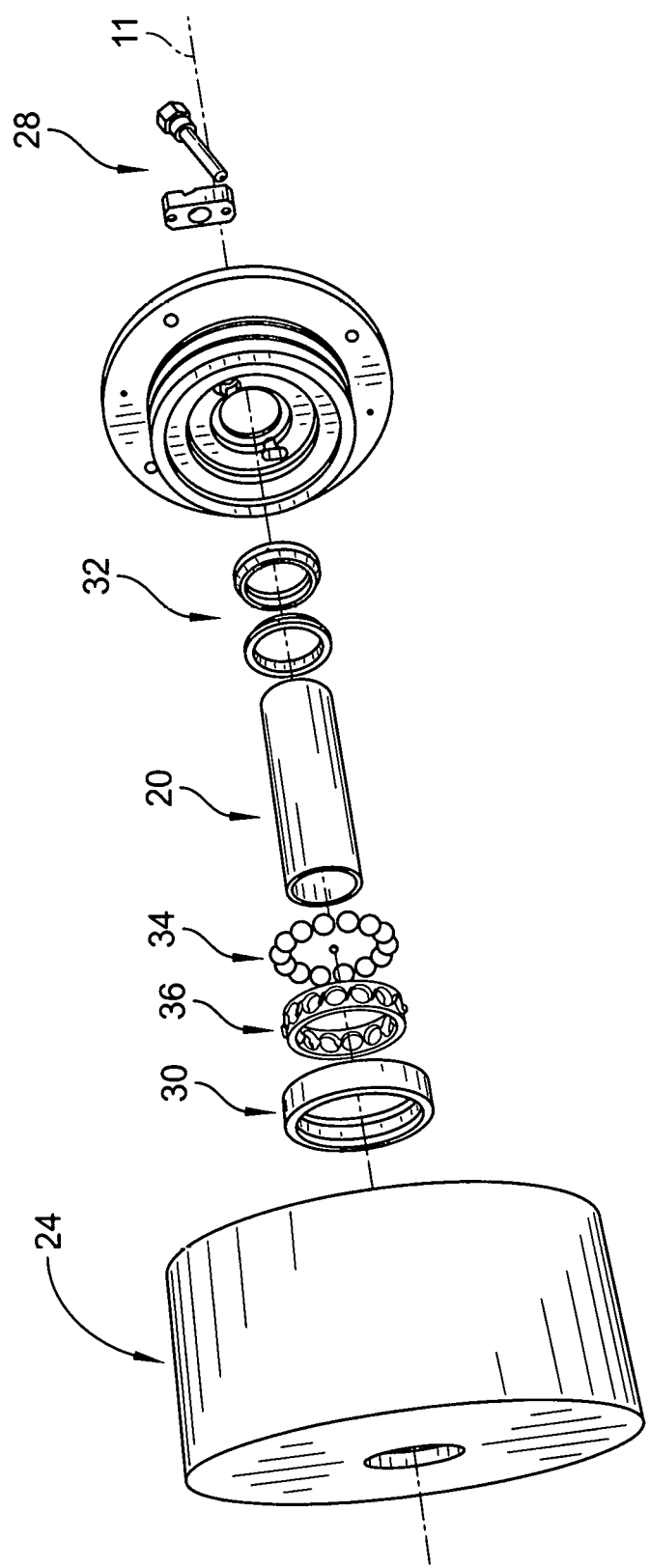
FIG. 5 is an exploded perspective view of the bearing system and the rotor, the bearing system including an inner bearing housing, an inner bearing race, an outer bearing race, a plurality of rotating components, an outer bearing housing, a bearing endplate, and the lubrication system.
Figure 6:
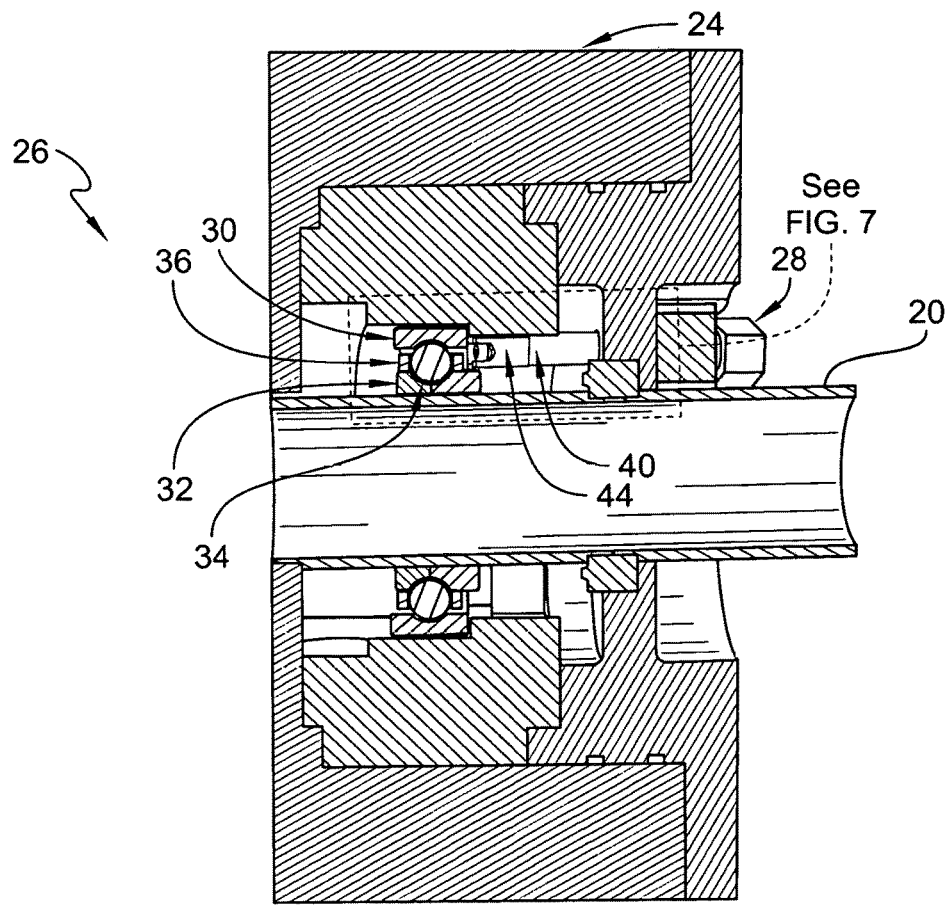
FIG. 6 is a side elevation and sectional view of the bearing system showing the windage barrier positioned upstream of the side-jet injector.
Figure 7:
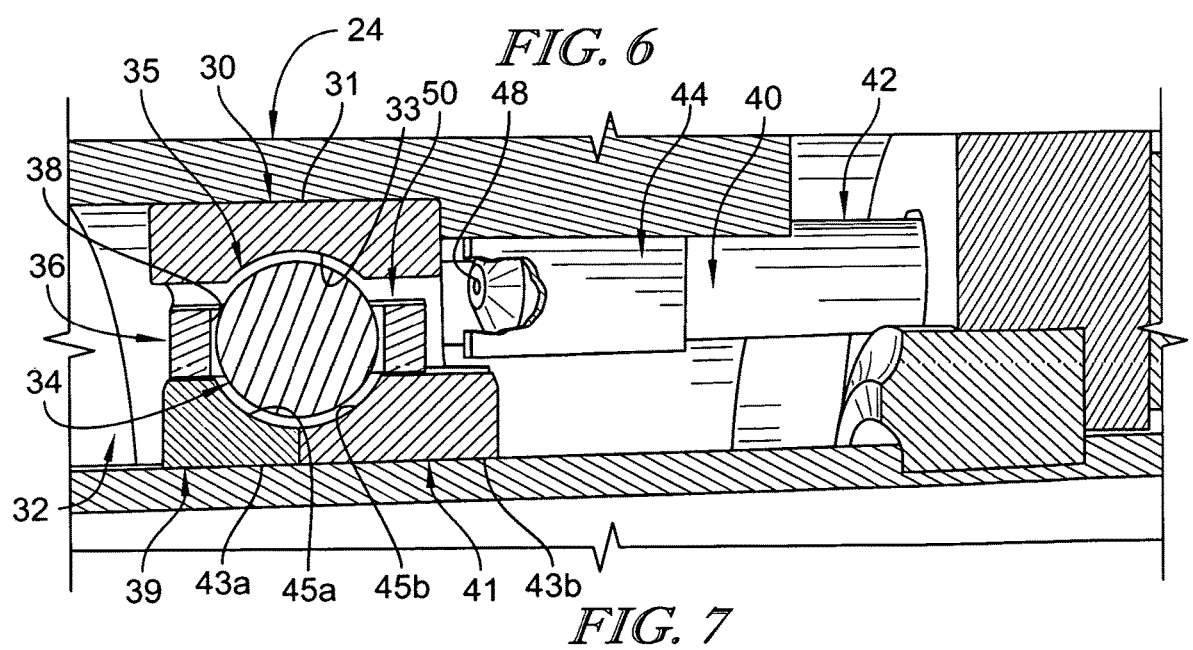
FIG. 7 is an enlarged view of the dashed portion of FIG. 6 with a portion of the windage barrier removed to show that the side-jet injector includes an outlet configured to discharge a stream of lubrication from a lubrication source and the outlet is positioned adjacent to a gap between the inner race and the outer race that opens toward the plurality of rotating components between the inner race and the outer race.

As shown in FIGS. 5 and 6, the outlet 48 of the injector 42 is positioned directly adjacent to the space 50 such that the outlet 48 is aligned radially with the space 50. The windage barrier 44 is positioned upstream of and directly adjacent to the outlet 48 to block windage 15 from reaching the outlet 48. Under the cover of the windage barrier 44, the stream of lubrication travels across the air gap 49 from the outlet 48 to the bearing unit 26 through the zone of stagnant fluid 46. In the illustrative embodiment, the side-jet injector 42 is configured to deliver the stream of the lubrication source at a velocity of about 100 feet per second and at a pressure of about 80 psi. However, in other embodiments any suitable velocity and pressure may be used.

The windage barrier 44 may be coupled to a variety of components in a fixed position relative to the side-jet injector 42. In one embodiment, the windage barrier 44 is coupled or mounted to the side-jet injector 42. In another embodiment, the windage barrier 44 is coupled or mounted to the bearing housing 24.

A first embodiment of the windage barrier 44 is illustratively shown as a plate as shown in FIGS. 2-8. The windage barrier 44 includes an upstream surface 54 and a downstream surface 56. The upstream surface 54 and the downstream surface 56 are parallel with one another and extend axially through the cavity 40 from a leading end 60 of the windage barrier 44 to a trailing end 62 along an axis 58. The axis 58 in the illustrative embodiment is parallel with the central reference axis 11, however, in other embodiments, the windage barrier 44 may extend along an axis that is not parallel with the central axis. The windage barrier 44 is arranged generally perpendicular to the direction of windage 15 flow through the cavity 40, however, in other embodiments, the windage barrier 44 may not be arranged perpendicular to the direction of windage flow.

Figure 8:
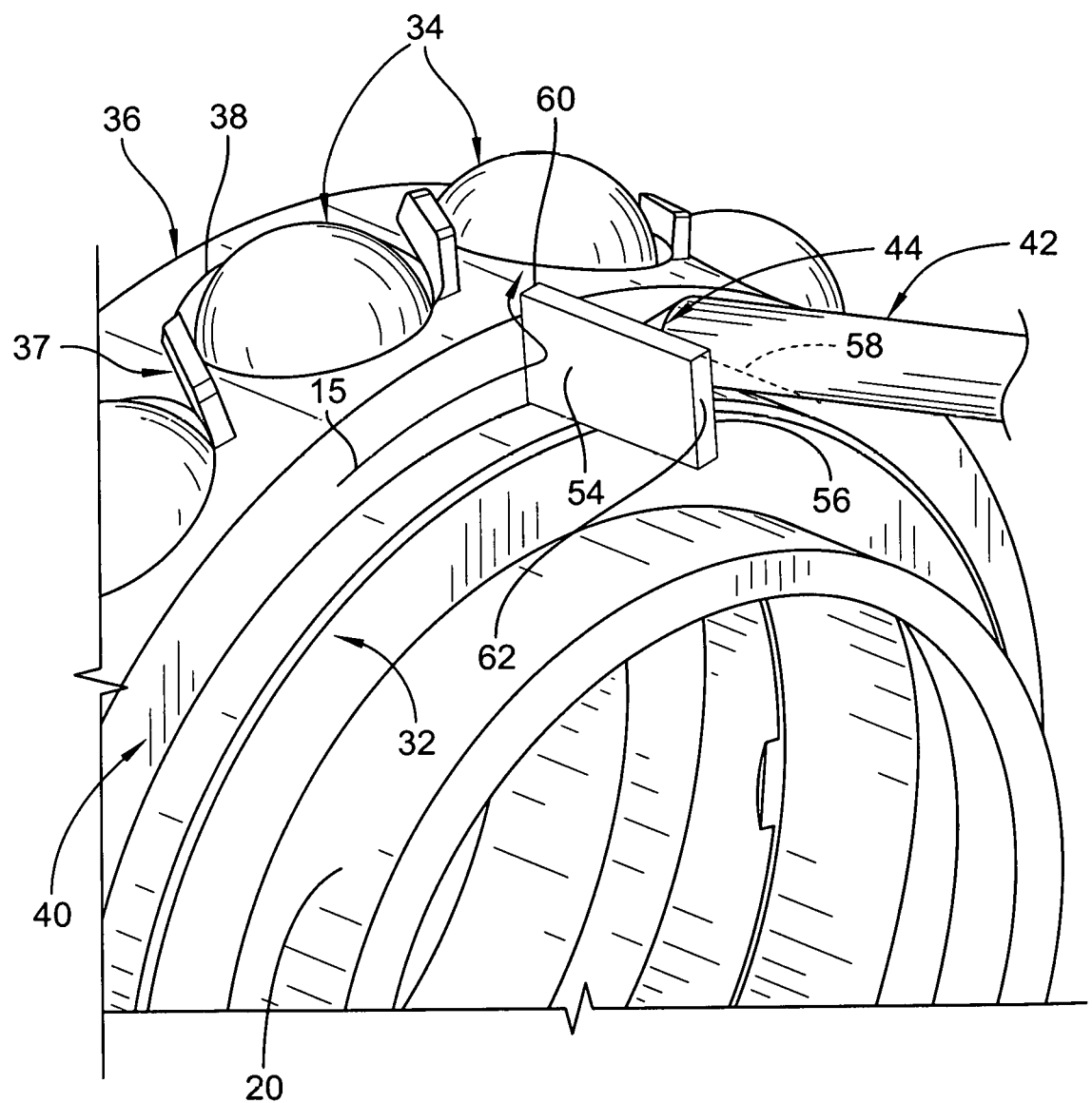
FIG. 8 is a partial perspective view of the bearing system with some components removed to show a first embodiment of the windage barrier showing the windage barrier in the form of a plate that extends radially outward away from the central axis along a radial axis that is generally perpendicular to the central axis.

The windage 15 flows through the cavity 40 and impinges on the upstream surface 54 of the windage barrier 44 where it is directed toward the bearing unit 26 as shown in FIGS. 7 and 8. The side-jet injector 42 is positioned directly downstream of the windage barrier so that the windage is directed toward the bearing unit 26 directly upstream of the outlet 48 of the side-jet injector 42. The leading end 60 of the windage barrier 44 is spaced apart from the bearing unit 26 by a distance 64 that is less than or equal to the air gap 49 between the outlet 48 of the side-jet injector 42 and the bearing unit 26. In other words, the leading end 60 is positioned axially forward of or axially aligned with the outlet 48 so that the outlet 48 is within the zone of stagnant fluid 46. In the illustrative embodiment, the leading end is spaced apart from the bearing unit 26 by a distance of about 0.60 cm (0.15 inches); however, in other embodiments, the leading end 60 may be spaced apart from the bearing unit 26 by any suitable distance.

The windage barrier 44 has a radially-outer extent that is radially farther from the central axis than the outlet 48 of the side-jet injector 42 as shown in FIG. 7. The windage barrier 44 also has a radially-inner extent that is closer to the central axis than the outlet 48 of the side-jet injector 42. In some embodiments, the windage barrier 44 has an axially-forward extent that is axially-forward of the outlet 48 of the side-jet injector 42.

The outer race 30 of the illustrative embodiment extends around the central axis 11 as a single annular member as shown in FIG. 6. The outer race 30 defines a radially outer surface 31, and a radially inner surface 33. The inner surface 33 includes an annular groove 35 that contacts the plurality of internal rotating components 34 and has a shape complimentary to the shape of the plurality of internal rotating components 34.

The inner race 32, as shown in FIGS. 6 and 7, includes a forward ring 39 and an aft ring 41 forming a radially outer surface 45a, 45b for engagement with the plurality of rotating components 34. The outer surfaces 45a, 45b define a groove formed partly of bearing surface portion 45a of the forward ring 39 and partly of bearing surface portion 45b of the aft ring 41. Radially-inner surfaces 43a, 43b are coupled directly to the rotor 20 such that the inner race 32 is mounted for rotation with the rotor 20.

The cage 36 of the illustrative embodiment may include a plurality of lubricant-ejector fins 37 extending radially from the cage 36 and configured to direct lubricant out of the space 50 as shown in FIG. 8. Each lubricant-ejector fin 37 defines a curved shape from its leading edge to its trailing edge when viewed in the radial direction. The lubricant-ejector fins 37 are illustratively positioned at equal circumferential intervals along the cage 36. An individual fin 37 is positioned between each of the rotating components 34.

Figure 9:
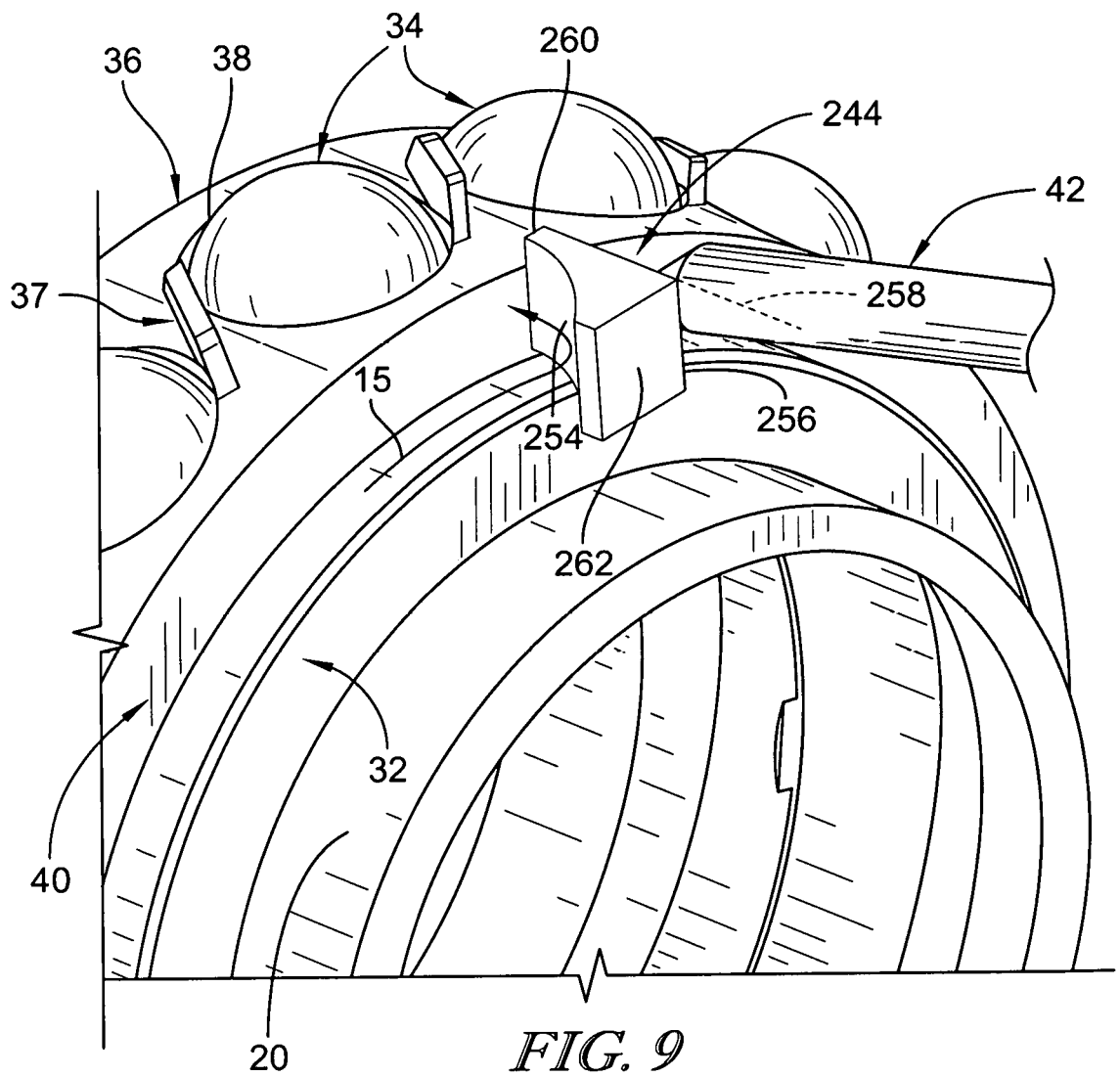
FIG. 9 is a perspective view of a second embodiment of a windage barrier, in accordance with the present disclosure, the windage barrier including a an upstream surface with a curved portion that is configured to redirect the windage in the cavity toward the plurality of rotating components.
Figure 10:
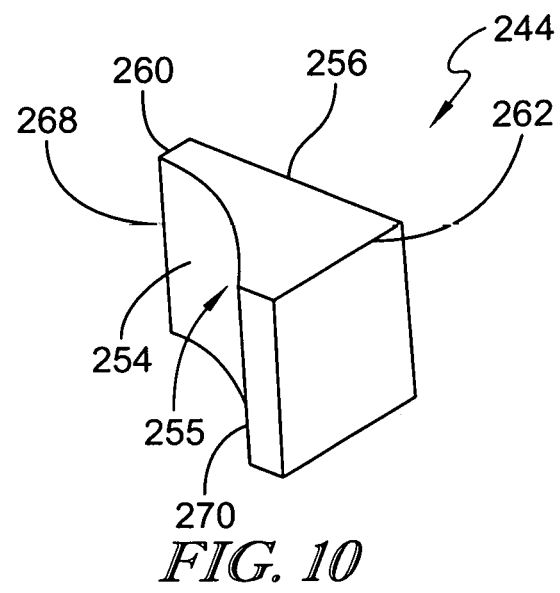
FIG. 10 is an enlarged top perspective view of the windage barrier of FIG. 9.

A second embodiment of a windage barrier 244 is shown illustratively in FIGS. 9 and 10. The windage barrier 244 includes many of the same features described above for windage barrier 44 and shown in FIGS. 2-8. As such, similar reference numbers in the 200 series are used to describe like features present in windage barrier 244. Reference is made to the description above related to windage barrier 44 except for features that are unique to windage barrier 244, which are described in detail below.

The windage barrier 244 is shown, for example, in FIGS. 9 and 10. The windage barrier 244 includes an upstream surface 254 and a downstream surface 256. The upstream surface 254 includes a curved portion 255 and extends through the cavity 40 from an axially-forward end 260 of the windage barrier 244 to an axially-aft end 262 of the windage barrier 244. The downstream surface 256 is substantially planar and is arranged along an axis 258 that extends generally parallel with the central axis 11.

The windage 15 flows through the cavity 40 and impinges on the curved portion 255 of the upstream surface 254 where it is directed toward the bearing unit 26 as shown in FIG. 9. The curved portion 255 includes a first end 268 at the axially-forward end 260 of the windage barrier 244 and a second end 270 at the axially-aft end of the windage barrier 244. The first end 268 is spaced apart circumferentially from the second end 270 such that the second end 270 is positioned upstream of the first end 268 in the cavity 40. The first end 268 is spaced apart axially from the second end 270. In the illustrative embodiment, the curved portion 255 of the upstream surface has a common center such that the curve is constant as it extends from the first end 268 to the second end 270. In other embodiments, the curved portion may include a curve that is not constant as it extends from the first end 268 to the second end 270. In yet another embodiment, the curved portion includes a curve with a slope that is constantly changing as it extends from the first end 268 to the second end 270.

The side-jet injector 42 is positioned directly downstream of the windage barrier 244 so that the windage 15 is directed toward the bearing unit 26 directly upstream of the outlet 48 of the side-jet injector 42. The windage impinges initially on the curved portion 255 at the second end 270 and travels along the curved portion 255 toward the first end 268. Through this motion, the direction of windage flow is changed by about 90 degrees from a circumferential flow at the second end 270 to an axial flow at the first end 268. The curved portion 255 redirects the windage flow in this manner to encourage the stream of lubrication to flow axially toward the bearing unit 26.

Figure 13:
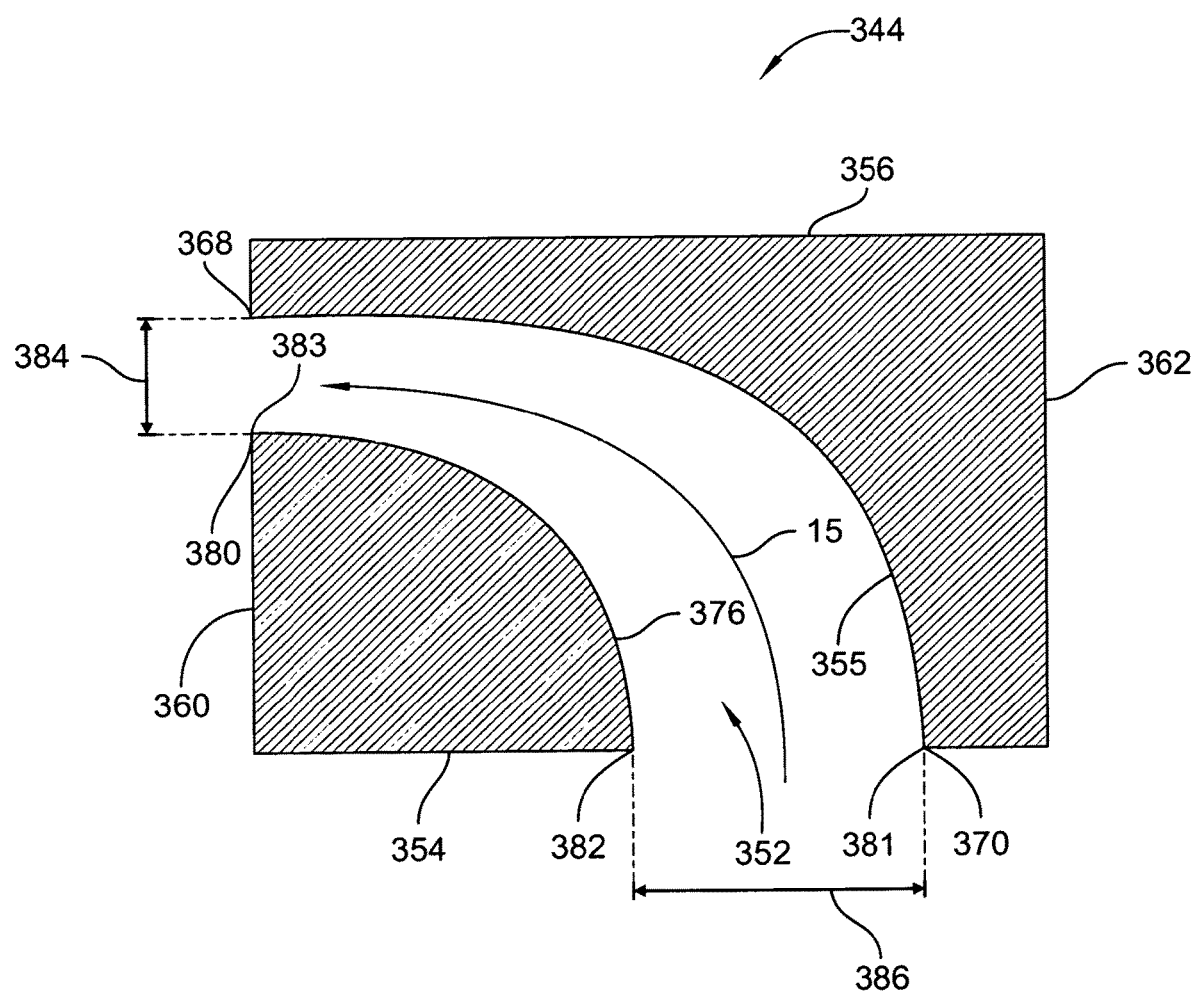
FIG. 13 is a top view and sectional view of the windage barrier of FIGS. 11 and 12 showing that the upstream surface is spaced apart from the downstream surface a first distance at a first end of the channel and the upstream surface is spaced apart from the downstream surface a second distance at a second end of the channel and the first distance is greater than the second distance so that the windage entering the channel is accelerated as the windage flows from the first end to the second end.

A third embodiment of a windage barrier 344 is shown illustratively in FIGS. 11-13. The windage barrier 344 includes many of the same features described above for windage barriers 44 and 244 and shown in FIGS. 2-9. As such, similar reference numbers in the 300 series are used to describe like features present in windage barrier 344. Reference is made to the description above related to windage barriers 44, 244 except for features that are unique to windage barrier 344, which are described in detail below.

The windage barrier 344 include a channel 352 as shown in FIGS. 11-13. The windage barrier 344 includes an upstream surface 354 and a downstream surface 356. The upstream surface 354 and the downstream surface 356 are parallel to one another and extend axially parallel with the central axis 11 from an axially-forward end 360 to an axially-aft end 362. The channel 352 extends through the windage barrier 344 from the upstream surface 354 to the axially-forward end 360 of the windage barrier 344.

The channel 352 has a pair of curved side wall portions 355, 376 that define an extent of the channel 352. The curved portion 355 includes a first end 368 at the axially-forward end 360 of the windage barrier 344 and a second end 370 located between the axially-forward and axially-aft ends 360, 362. The first end 368 is spaced apart circumferentially from the second end 370 such that the second end 370 is positioned upstream of the first end 368 in the cavity 40. The first end 368 is arranged axially-forward of the second end 370. The curved portion 376 extends from a first end 380 at the axially-forward end 360 of the windage barrier 344 to a second end 382 located between the axially-forward and axially-aft ends 360, 362.

The side-jet injector 42 is positioned directly downstream of the windage barrier 344 so that the windage is directed toward the bearing unit 26 directly upstream of the outlet 48 of the side-jet injector 42. The channel 352 initially receives the windage through an inlet 381. The windage 15 impinges on the curved portion 355 and is then directed out of an outlet 383 toward the bearing unit 26 by the curved portions 355, 376 defining the shape of the channel 352. Through this motion, the direction of windage flow is changed by about 90 degrees from a circumferential flow to an axial flow. The channel 352 redirects the windage flow in this manner to encourage the stream of lubrication to flow axially toward the bearing unit 26.

The channel 352 is configured to provide an air-knife effect directly upstream of the outlet 48 of the side-jet injector 42 using the windage 15 received through the inlet 381. The first ends 368, 380 of the curved portions 355, 376 are spaced apart from one another by a first distance 384. The second ends 370, 382 of the curved portions 355, 376 are spaced apart from one another by a second distance 386. The second distance 386 is greater than the first distance 384 such that the channel 352 narrows as it extends from the inlet 381 to the outlet 383 to accelerate the windage flowing through the channel 352 and provide the air-knife effect.

In one embodiment, the curved portions 355, 376 may have respective common centers such that their curves have a constant slope. In the illustrative embodiment, the curved portions 355, 376 include respective curves with a slope that is not constant as shown in FIG. 13. In other embodiments, the curved portions 355, 376 may include respective curves with a slope that is constantly changing.

As shown in FIG. 13, the curved portion 355 interfaces with the curved portion 376 to define the channel 352. The curved portion 355 is concave relative to the curved portion 376 while the curved portion 376 is convex relative to the curved portion 355.

In illustrative embodiments, high speed bearings may use complicated under race lubrication techniques to properly cool and lubricate the rolling elements and raceways. This comes from the difficulties associated with obtaining acceptable capture efficiencies with other methods of bearing lubrication, such as side jetting, at high speed operation. Side jet lubrication may be simple and may be easily integrated into gas turbine engine architectures as opposed to under race lubrication which often requires complex engine architectures to be developed and which result in more expensive components, additional components, and more constrained bearing cavities in terms of design flexibility. In illustrative embodiments, gas turbine engines may require smaller and faster engine cores. To aid in the reduction of complexity and cost in these systems, high speed side jetting may be used with the windage barriers disclosed herein to achieve 1.5 to 3.5 MDN.

It has been shown that at higher speeds, windage within the sump (particularly around the bearing) plays a major role in the oil streams ability to make it to, and penetrate into, the bearing with a side jetting architecture. The oil may be shot out of the jet at 100 ft/sec based on 80 psi oil pressure to a bearing with an inner ring rotation of about 29,400 rpm.

In illustrative embodiments, a more cost effective lubrication method (side jetting) to lubricate and cool a high speed bearing is disclosed herein. The embodiments described herein may increase an amount of oil that crosses the air gap between the oil jet and the bearings. The illustrative windage barriers may provide a more conducive environment for side jetting methods. Additionally, it should be noted that these disclosures are applicable for any components that require oil in high windage environments such as thrust bearings, roller bearings, gears, seal runners, etc.

In illustrative embodiments, a scoop structure is mounted on the upwind side of the oil jet nozzle to turn the windage from a tangential flow into an axial flow at the bearing. This creates an air curtain that effectively acts as a dam to the air flow providing a zone of stagnant air behind it. This allows the oil to bridge the air gap before the air flow can push it away from the bearing. This structure is at least 0.150" away from any rotating components.

In illustrative embodiments, a scoop like geometry may grab the air and redirect it to the bearing face at 90 degrees to the windage direction. This effectively creates an air knife effect. This air knife will then break up the windage locally and provide the stagnate air needed to allow the oil from the jet to cross the air gap to the bearing.

In illustrative embodiments, a simple plate may be mounted to the oil jet nozzle to break up the windage in front of the oil jet. This then creates a stagnation zone that is significantly easier for the oil to make it across the air gap. This figure shows streamlines of the oil and the pressure that develops on the flat surface.

While the disclosure has been illustrated and described in detail in the foregoing drawings and description, the same is to be considered as exemplary and not restrictive in character, it being understood that only illustrative embodiments thereof have been shown and described and that all changes and modifications that come within the spirit of the disclosure are desired to be protected.

What is claimed is:
1. A bearing system comprising
an outer race that extends around a central axis,
an inner race that extends around and rotates in a first direction about the central axis relative to the outer race and spaced apart radially from the outer race to define a bearing cavity therebetween,
a plurality of internal rotating components arranged radially between the inner race and the outer race to engage the inner race and the outer race, and
a lubrication system configured to provide lubrication to the plurality of internal rotating components during rotation of the inner race, the lubrication system including a side-jet injector located in spaced-apart relation to the outer race in a fixed position relative to the outer race and configured to inject a stream of lubrication from an outlet formed in the side-jet injector in an axial direction toward the plurality of internal rotating components, and a windage barrier located adjacent to the outlet of the side-jet injector in a fixed position relative to the side-jet injector and the outer race upstream from the outlet and configured to establish a zone of stagnant fluid downstream of the windage barrier such that the stream moves through the zone from the outlet to the plurality of rotating components.

2. The bearing system of claim 1, wherein the windage barrier is a plate.

3. The bearing system of claim 2, wherein windage barrier extends along an axis that is generally parallel to the central axis.

4. The bearing system of claim 2, wherein the windage barrier includes a first end and a second end spaced apart axially from the first end to define the zone of stagnant fluid circumferentially downstream of the windage barrier between the first and second ends and the outlet of the injector is positioned axially between the first and second ends.

5. The bearing system of claim 1, wherein the windage barrier includes a downstream surface facing toward the injector and an upstream surface facing away from the injector and the upstream surface has a curved portion.

6. The bearing system of claim 5, wherein the curve portion is defined between a first end and a second end arranged circumferentially upstream of the first end.

7. The bearing system of claim 6, wherein the second end is arranged axially forward of the first end.

8. The bearing system of claim 1, wherein the windage barrier is formed to include a channel arranged to extend from an upstream surface of the structure to an axially-forward end of the structure.

9. The bearing system of claim 8, wherein the channel is defined by a first curved side wall portion and a second curved side wall portion.

10. The bearing system of claim 9, wherein the first curved portion is spaced apart from the second curved portion by a first distance at a first end and the first curved portion is spaced apart from the second curved portion by a second distance at a second end, the second end spaced axially from the first end, and the first distance is greater than the second distance.

11. The bearing system of claim 9, wherein the first curved side wall portion has a first slope and the second curved side wall portion has a second slope and the first slope is less than the second slope.

12. The bearing system of claim 1, wherein the outlet of the side-jet injector is spaced apart from the rolling components by at least 0.15 inches.

13. The bearing system of claim 1, wherein the windage barrier is coupled to the outer race in a fixed position relative to the outer race.

14. The bearing system of claim 1, wherein the windage barrier is coupled to the side-jet injector in a fixed position relative to the side-jet injector.

15. A gas turbine engine comprising
a bearing housing formed to include a cavity therein,
a rotor located in the cavity and adapted for rotation in a first direction about a central axis relative to the bearing housing, the rotor being configured to generate a windage that flows in the first direction during rotation of the rotor about the central axis,
a bearing unit arranged to extend between and interconnect the rotor and the bearing housing to support the rotor, and
a lubrication system configured to provide lubrication to the bearing unit during rotation of the rotor, the lubrication system including a side-jet injector coupled to the case in a fixed position relative to the bearing unit and the rotor and configured to inject a stream of lubrication from an outlet formed in the side-jet injector in an axial direction toward the bearing unit to lubricate and cool the bearing unit, and a windage barrier coupled to the bearing housing in a fixed position adjacent to and upstream from the outlet and configured re-direct the windage from flowing in the first direction to flowing another direction perpendicular to the first direction to create a zone of stagnant air downstream of the windage barrier such that the stream of lubrication moves through the zone from the outlet to the bearing unit,
wherein the bearing unit has a bearing speed of greater than about 1.5 MDN.

16. The bearing system of claim 15, wherein the windage barrier is a plate.

17. The bearing system of claim 16, wherein windage barrier extends along an axis that is generally parallel to the central axis.

18. The bearing system of claim 15, wherein the windage barrier includes a downstream surface facing toward the injector and an upstream surface facing away from the injector and the upstream surface has a curved portion.

19. The bearing system of claim 15, wherein the windage barrier is formed to include a channel that extends from an upstream surface of the structure to an axially-forward end of the structure, and wherein the channel is defined by a first curved side wall portion and a second curved side wall portion.

20. The bearing system of claim 19, wherein the downstream surface is spaced apart from the upstream surface by a first distance at a first end and the downstream surface is spaced apart from the upstream surface by a second distance at a second end, the second end spaced axially from the first end, and the first distance is greater than the second distance.

* * * * *